(12) United States Patent
Kossek et al.

(10) Patent No.: US 8,375,807 B2
(45) Date of Patent: Feb. 19, 2013

(54) MESSGERAT

(75) Inventors: Benjamin Kossek, Rheinfelden (DE); Michal Bezdek, Aesch (CH); Pierre Ueberschlag, Saint-Louis (FR)

(73) Assignee: Endress + Hauser Flowtec AG, Kagenstr., Reinach (CH)

( * ) Notice: Subject to any disclaimer, the term of this patent is extended or adjusted under 35 U.S.C. 154(b) by 139 days.

(21) Appl. No.: 12/949,380

(22) Filed: Nov. 18, 2010

(65) Prior Publication Data
US 2011/0120229 A1 May 26, 2011

(30) Foreign Application Priority Data

Nov. 19, 2009 (DE) .......................... 10 2009 046 886
Nov. 11, 2010 (DE) .......................... 10 2010 043 781

(51) Int. Cl.
*G01F 1/20* (2006.01)

(52) U.S. Cl. ..................................................... 73/861.18

(58) Field of Classification Search ............... 73/861.08, 73/861.027, 861.23, 861.18
See application file for complete search history.

(56) References Cited

U.S. PATENT DOCUMENTS

| 2,381,890 | A |   | 8/1945 | Ebbets |
| 3,964,308 | A | * | 6/1976 | Scarpa ....................... 73/861.27 |
| 4,970,902 | A | * | 11/1990 | Misumi et al. ............. 73/861.23 |
| 5,121,658 | A | * | 6/1992 | Lew .................................. 73/195 |
| 5,369,998 | A | * | 12/1994 | Sowerby ................... 73/861.04 |
| 5,962,790 | A |   | 10/1999 | Lynnworth et al. |
| 6,925,891 | B2 | * | 8/2005 | Suginouchi et al. ....... 73/861.27 |
| 7,383,741 | B2 | * | 6/2008 | Fukano et al. ............. 73/861.27 |

FOREIGN PATENT DOCUMENTS

| DE | 103 24 454 | 11/2004 |
| DE | 10 2004 028 078 | 1/2006 |

OTHER PUBLICATIONS

German Search Report dated Sep. 29, 2011.

* cited by examiner

*Primary Examiner* — Jewel V Thompson
(74) *Attorney, Agent, or Firm* — Bacon & Thomas, PLLC

(57) ABSTRACT

A measuring device for registering at least one measured value of at least one process variable. The measuring device comprises a measuring tube. The measuring tube has at least one T-joint, on which at least one measurement transmitter is arranged, wherein the measuring tube together with the T-joint is monolithic, and wherein the T-joint is producible from the measuring tube at least partially by a plastic deformation method.

11 Claims, 4 Drawing Sheets

"A"

MESSGERAT

The present invention relates to a measuring device and a manufacturing process for the manufacture of such, wherein a measuring tube has at least one T-joint, with which a measuring transducer is connectable.

Known, especially in flow measurement by means of ultrasound or in thermal flow measurement, are various types of measuring devices, which feature measuring transducers mounted on measuring tubes. U.S. Pat. Nos. 4,742,717 and 4,823,612 show sleeves for accommodating measuring transducers, which are welded with the measuring tube. U.S. Pat. Nos. 5,693,892 and 5,962,790 also show apparently one-piece, sensor nozzles connected with the measuring tube.

If the sensor nozzles are welded to the measuring device, a great disadvantage in such case is that, for measuring tubes with different tube diameters, different sensor nozzles must be used. On the other hand, primary forming methods have become known to produce together monolithically in one manufacturing process measuring tubes with sensor nozzles in the form of T-joints. Primary formed, measuring tubes most often require, however, very complex, subsequent working. Also, for manufacturing very thin measuring tubes, or in the case of selected materials, a primary forming method, e.g. casting, is really not readily feasible.

An object of the invention is to provide a cost effectively manufactured measuring device, especially a flow measuring device.

The object is achieved by the features listed in the independent claim 1.

Further developments and embodiments of the invention can be found in the features listed in the respective dependent claims.

In addition to the many classic, plastic deformation methods, such as a cold forming method, collar drawing is also known. Plastic deformation methods in general and collar drawing specifically are known to those skilled in the art.

The invention allows for numerous forms of embodiment. A few of these should be briefly explained here in greater detail.

In order to manufacture a measuring device of the invention, a measuring tube must first be produced according to the method of the invention. The measuring tube includes at least one T-joint, which, for example, is produced from the measuring tube via a cold plastic deformation method, e.g. collar drawing. In such case, the T-joint has a first interface, which is produced with a predetermined shape and size. This interface is formed, for example, in a ring shape, wherein the T-joint is embodied tubularly in the region of the interface. Thus, a measurement transmitter or a measuring transducer, which, in each case, has a second interface congruent to the first interface, wherein the second interface is connectable with the first interface, can be connected with the measuring tube via the T-joint. An advantage of the predetermined interfaces is that equally constructed measurement transmitters or measuring transducers are mountable on measuring tubes of various nominal diameters. These are simply placed on the interfaces of the T-joints, or connected with these. The manufacture of equal shapes and sizes of the interfaces is enabled by the plastic deformation method. Only a primary forming method would enable the manufacture of measuring tubes and corresponding measuring devices with predetermined interfaces on measuring tubes of different nominal diameters. However, especially in the case of metal measuring tubes, primary forming methods are considerably more complex and more expensive.

With the method, of the invention, at least two measuring tubes of different nominal diameters having, in each case, at least one T-joint with a first interface, can thus be produced in such a manner, that the two first interfaces of the T-joints of the at least two measuring tubes have approximately identical shape and size. Due to the different tube curvatures in the case of different tube diameters and/or due to the different wall thicknesses of the measuring tubes, the measurement transmitters or the measuring transducers would have to have interfaces in each case matched to the particular measuring tube, if the measurement transmitters or the measuring transducers would be arranged directly on the measuring tube, e.g. would be welded directly onto the measuring tube, in the case of which, previously, a bore would be made in the measuring tube wall.

A manufacturing process for the manufacture of a measuring device with a measuring tube and at least one measurement transmitter for processing at least one measured value, especially the flow of a measured medium through the measuring tube, includes the method steps for manufacture of the measuring tube, thus especially that at least one T-joint of the measuring tube is produced by means of deforming the measuring tube, and furthermore that then the measurement transmitter is connected with the T-joint in a shape-interlocking, force-locked or material-bonded manner. Equally, one or more measuring transducers for registering at least one measured value of at least one process variable, e.g. of the flow of a measured medium through the measuring tube, would be connected with the T-joint in a shape-interlocking, force-locked or material-bonded manner.

In such case, the at least one T-joint is produced with a first interface having a predetermined shape and size in such a manner, that the first interface of the T-joint is connectable with a second interface of a predetermined shape and size on the at least one measurement transmitter and/or measuring transducer in a material-bonded, force-locked or shape-interlocking manner. The measurement transmitter and/or the measuring transducer are/is then connected via its second interface with the first interface of the T-joint, e.g. the measurement transmitter and/or the measuring transducer are/is welded to the end of the T-joint.

The T-joint forms, for example, a first interface, e.g. by an end of the T-joint having an elliptical—especially approximately circularly round-cross section and a predetermined nominal dimension at the end the T-joint, thus, for example, a predetermined nominal diameter. Furthermore, the T-joint can be produced with a predetermined wall thickness at the end, which, for example, is approximately constant along the periphery of the T-joint. The measurement transmitter and/or the measuring transducer are/is then manufactured with, as the second interface, an elliptical cross section on a connection end of the measuring transducer, especially an approximately circularly round cross section, and a predetermined nominal width on the connection end of the measurement transmitter and/or the measuring transducer, especially a predetermined nominal diameter, wherein the predetermined nominal dimensions of the connection end of the measurement transmitter and/or of the measuring transducer and the end of the T-joint are essentially identical. Certain tolerance deviations are naturally present in given cases, within which the measurement transmitter and/or the measuring transducer can easily be placed against the T-joint and welded thereto.

Besides a welded connection, other connection possibilities are options. Thus, a pressing of the measurement transmitter and/or of the measuring transducer into the T-joint is possible, e.g. such that the measurement transmitter and/or the measuring transducer and the T-joint have an interference fit and the measuring tube is heated and/or the measurement transmitter and/or the measuring transducer cooled, before introduction of the measurement transmitter and/or the measuring transducer into the T-joint. Alternatively, an internal thread, for example, can be cut into the T-joint and an external thread congruent therewith can be provided on the measurement transmitter and/or on the measuring transducer. In this way, there is enabled a simple exchanging of the measurement transmitter and/or of the measuring transducer, which is then only screwed into the T-joint. Equally constructed measurement transmitters and/or measuring transducers are, of course, not necessary; however, the measurement transmitters and/or the measuring transducers must have essentially identical, second interfaces.

If the T-joints of the measuring tubes are produced by collar drawing, the same tool, for example, is also used for different measuring tubes with different nominal diameters and/or wall thicknesses. Besides that, methods using other tools are also known, which lead to the same result. Most often, in the case of collar drawing, a hole is drilled in the measuring tube wall, and then the T-joint is formed from the measuring tube using a mandrel or a rotating tool. Multistage plastic deformation processes are also known. The T-joint thus always bounds an opening in the measuring tube. This opening is, according to an embodiment of the invention, tightly sealed by the measurement transmitter and/or measuring transducer arranged on the T-joint.

A measuring device of the invention is manufacturable by a method of the invention. The measuring device includes a measuring tube having at least one T-joint on which is arranged at least one measurement transmitter for processing at least one measured value of at least one process variable, wherein the measuring tube together with the T-joint is monolithic, and wherein the T-joint is producible from the measuring tube at least partially by a plastic deformation method. Furthermore, on an additional T-joint, there can be arranged a measuring transducer for registering at least one measured value of at least one process variable. The measuring tube has, for example, an elliptical, especially approximately circularly round, cross section, and is principally made of metal or a metal alloy, especially stainless steel. Since the T-joint is monolithic with the measuring tube, the T-joint is therewith, moreover, also made of the same material. The term "monolithic" means composed from one large piece, in contrast to assembly from individual parts. The term "T-joint" refers to a T-shaped joint of a tubular, or pipe, line. It is, for example, generally produced by casting or other primary forming methods, or by deforming the tubular, or pipe, line. A known plastic deformation method is collar drawing. In such case, for example, an elliptical preliminary hole is first made in the tubular, or pipe, line. Then, a T-joint forming tool is drawn through the preliminary hole out of the pipe. In such case, the material of the tubular, or pipe, line is bulged outward and the T-joint arises. Thereafter, the T-joint can then be machined flat. Then, for example, a second pipe can be soldered or welded to the T-joint.

The T-joint always has a predetermined height measured out from the measuring tube wall. This is especially important when the measurement transmitter or the measuring transducer is to be welded thereto. The T-joint usually has a longitudinal axis, which is approximately perpendicular to a measuring tube axis. A cross section then extends transversely to this longitudinal axis.

The second interface of the measurement transmitter and/or of the measuring transducer can also be manufactured of the same material as the measuring tube and the T-joint, respectively, especially when the measurement transmitter or the measuring transducer is to be welded to the T-joint. Then both the T-joint as well as the measurement transmitter or the measuring transducer has an interface in each case having an elliptical, especially approximately circular, cross section at an approximately planar end, respectively, connection end. The wall thicknesses on the end, respectively, connection end can also be constant along their peripheries.

In an embodiment of the invention, the measuring transducer at least partially protrudes into the T-joint. This part is then at least partially contactable by a measured medium in the measuring tube. A good sterilizability of the measuring device is the result. The measuring transducer is connected with the T-joint. This connection can occur directly or indirectly via the measurement transmitter or via a measuring transducer nozzle or a measurement transmitter nozzle. Thus, for example, a measuring transducer nozzle is welded with the T-joint and the measuring transducer is screwed together with the measuring transducer nozzle or is likewise welded with this.

As measuring transducers, especially ultrasonic transducers or temperature sensors can be used.

A measuring device can also have a number of T-joints and measuring transducers. For example, two equally constructed T-joints are produced in a measuring tube and these are connected with two equally-constructed measuring transducers. Thus, two ultrasonic transducers for inline, travel time difference measurement can be installed in a measuring tube.

A further development of the invention features a temperature sensor as a measuring transducer for registering at least one measured value of at least one process variable, wherein the temperature sensor is connected with the T-joint with which the measurement transmitter is connected, and wherein the temperature sensor protrudes into the T-joint and, during operation, is contacted by the measured medium in the measuring tube and tightly seals an opening in the measuring tube formed by the T-joint.

Further developed, this measuring device includes two other, equally constructed T-joints, at which, in each case, an ultrasonic transducer is arranged, wherein the two ultrasonic transducers are of equal construction. The measurement transmitter is thus used both for processing the measured values of temperature, as well as also for processing measured values of the travel times of the ultrasonic signals.

In an example of an embodiment, a measuring transducer is a pressure sensor.

The invention is used, for example, in industrial process technology, especially in flow measurement. Above all, the described further development with ultrasonic transducers for flow measurement and the temperature sensor for measuring the value of the temperature of the measured medium in the measuring tube is suitable for measuring gas, especially biogas.

BRIEF DESCRIPTION OF THE DRAWINGS

The invention will now be explained in greater detail based on the appended drawing, in which, in each case, an example of an embodiment is presented. Equal elements are provided in the figures with equal reference characters. The figures of the drawing show as follows.

DETAILED DISCUSSION IN CONJUNCTION WITH THE DRAWINGS

Figure 1A:
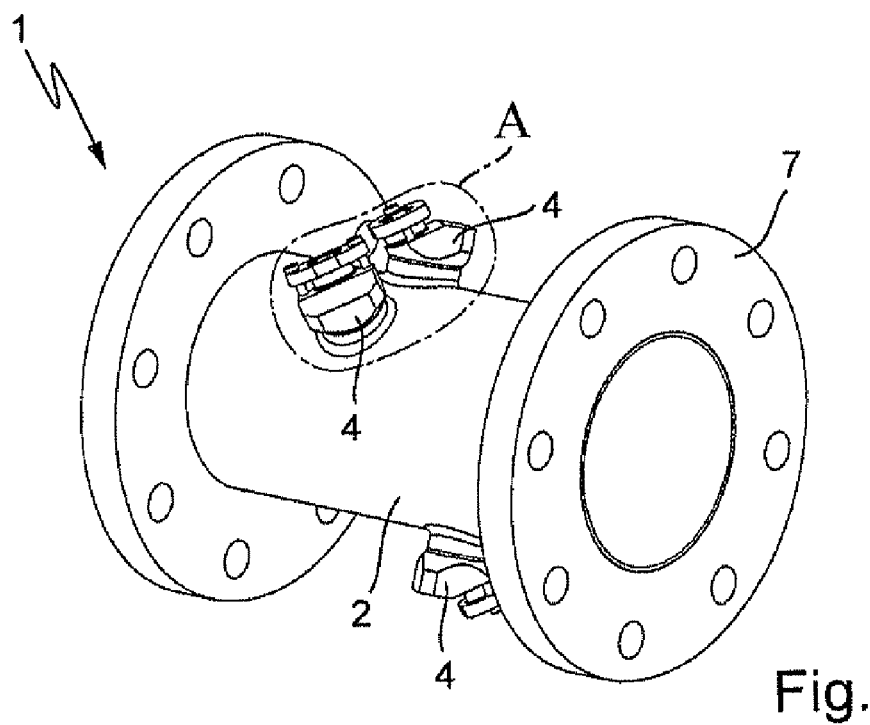
FIG. 1 shows perspectively, an ultrasound flow measuring device of the invention.
Figure 1B:
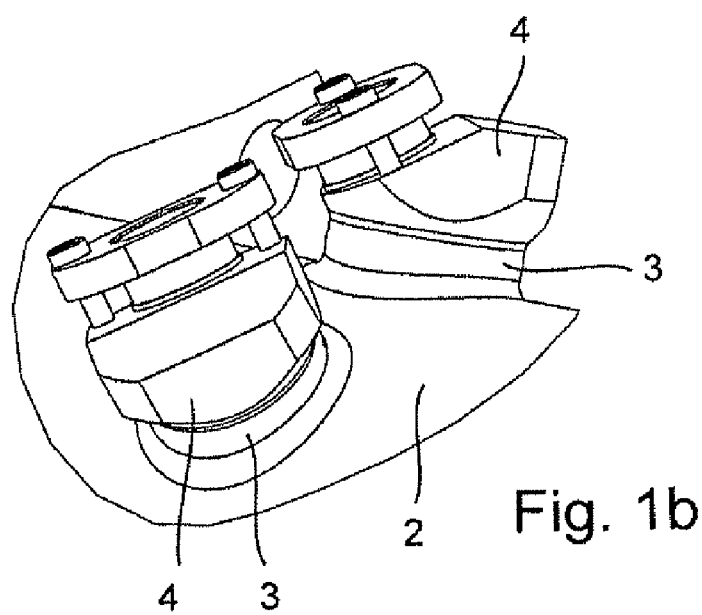

FIG. 1a shows an inline ultrasound flow measuring device 1 of the invention three dimensionally. FIG. 1b shows the detail A. On a measuring tube 2 with two connection flanges 7, four ultrasonic transducers 4 are arranged as measuring transducers. These are welded here onto T-joints 3. The T-joints 3 were produced from the measuring tube 2 by deforming the measuring tube 2. With this method, it is possible to manufacture equal T-joints 3 for differently large measuring tubes, and thereby to use equal measuring transducers on measuring tubes of various sizes.

Figure 2A:
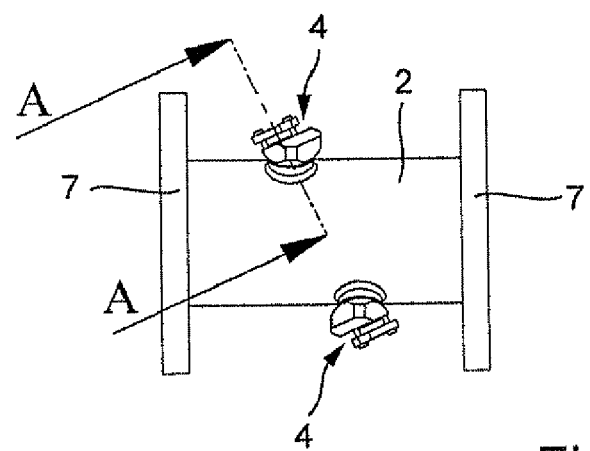
FIG. 2 is a detail view of the ultrasound flow measuring device in section.
Figure 2B:
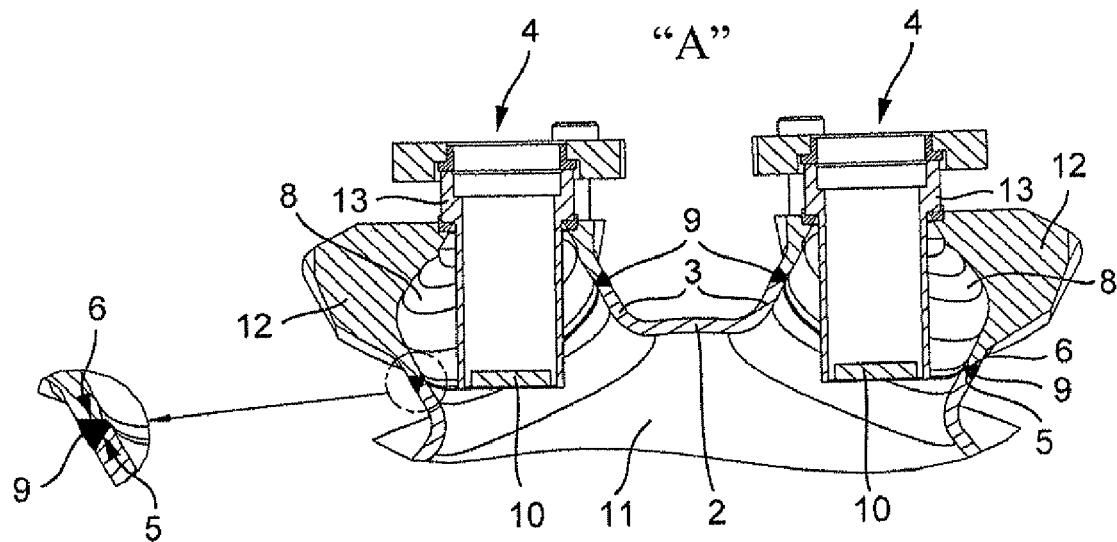

FIG. 2a and FIG. 2b show the detail A with a section through the two ultrasonic transducers 4 and the measuring tube 2. The ultrasonic transducers 4 have in this example of an embodiment not only equally embodied second interfaces 6, but the entire ultrasonic transducers 4 are also of equal construction. This is also unusual, because the ultrasonic transducers 4 are arranged inclined with respect to the measuring tube 2, i.e. the ultrasonic transducer elements 10, e.g. piezoelectric ceramic disks, transmit ultrasonic signals at an angle unequal to 90° and unequal to 0° relative to a measuring tube axis. The ultrasonic transducers 4 are connected with the T-joints 3 of the measuring tube 2 in a material-bonded manner via the welded seams 9.

The T-joints 3 have on a respective end 5 in each case an approximately circularly round cross section with a predetermined inner diameter and a predetermined wall thickness. The ultrasonic transducers 4 also have on a connection end 6 in each case an approximately circularly round cross section with a predetermined inner diameter and a predetermined wall thickness, wherein, here, the inner diameter of the T-joint and that of the measuring transducer on the end and on the connection end and the wall thicknesses are approximately equal. The ends 5 and connection ends 6 are in each case planar, whereby they form matching first and second interfaces. Due to the distance of the ends 5 from the measuring tube wall, the ultrasonic transducers 4 are easily weldable thereto.

The ultrasonic transducers 4 tightly seal the openings bordered by the T-joints 3 in the measuring tube 2. In such case, the ultrasonic transducers 4 in each case likewise have here an inner space 8, in which the particular ultrasonic transducer element 10 is contactable by the measured medium in the measuring tube 2. In such case, they protrude at least partially into the inner space of the measuring tube 11. Besides ultrasonic transducers 4, other measuring transducers are also connectable at the T-joints, such as, for example, temperature sensors.

The ultrasonic transducers 4 comprise in this example an ultrasonic transducer nozzle or measuring transducer nozzle 12, and an ultrasonic transducer holding element 13. The ultrasonic transducer element 10 separates the ultrasonic transducer holding element from the measured medium. The measuring transducer nozzle 12 includes the connection end 6 and is welded onto the T-joint 3. The measuring transducer nozzle 12 and ultrasonic transducer holding element 13 are here likewise connected in a sealed manner with one another, e.g. they are welded together. Alternatively, they can also be produced monolithically from one component.

Figure 3:
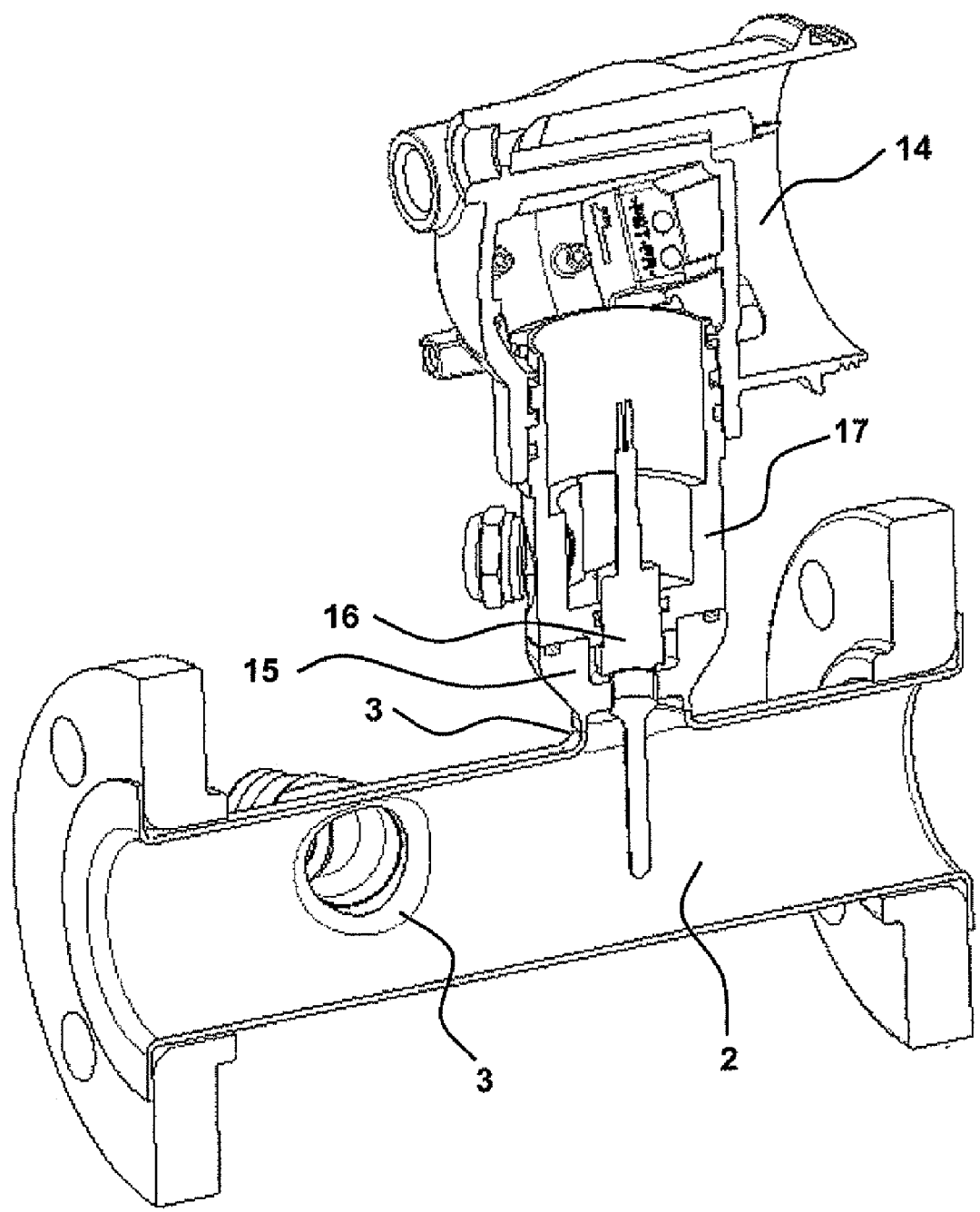
FIG. 3 is a section through a measuring device of the invention.

A further development is sketched in FIG. 3. The measuring tube 2 includes two T-joints 3. Connected with one T-joint 3 is the measurement transmitter nozzle 15, with which, in turn, the measurement transmitter 14 is connected via its measurement transmitter neck. The other T-joint 3 is not of further meaning here, and could also be omitted. In the same T-joint 3, with which the measurement transmitter 14 is connected, a temperature sensor 16 is arranged. In such case, the temperature sensor 16 protrudes not only into the measuring tube 2, but also into the measurement transmitter neck 17.

Figure 4:
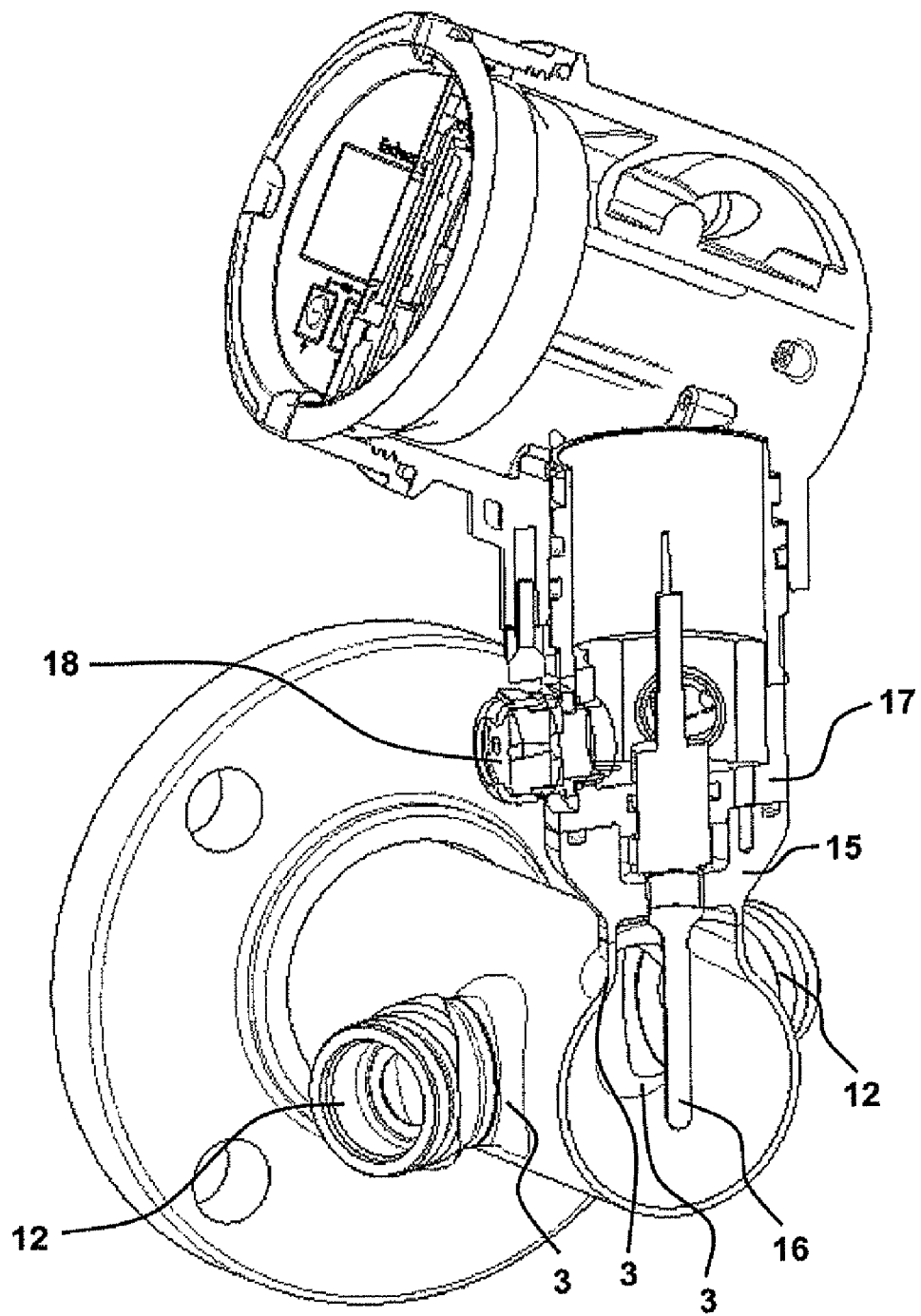
FIG. 4 is an additional section through a measuring device of the invention.

In FIG. 4, the measuring tube 2 includes additional T-joints 3, with ultrasonic transducers 4 arranged thereon. As in FIG. 3, a temperature sensor 16 is here also emplaced in the same T-joint 3 with which the measurement transmitter 14 is connected. Measurement transmitter 14 is here the measurement transmitter 14 of the ultrasonic transducers 4. It includes cable feedthroughs 18, in order to be connected with the ultrasonic transducers 4. At the same time, however, measurement transmitter 14 also performs the function of the measurement transmitter of the temperature sensor 16. The advantage lies in the fact that no separate holder or flange is provided as an interface to secure the measurement transmitter on the measuring tube. The measurement transmitter nozzle 15 is here simultaneously the measuring transducer nozzle, and also, together with the temperature sensor 16, tightly seals off the opening in the measuring tube formed by the T-joint 3. This measuring device is especially suited for flow measurement of gas, especially biogas.

In an embodiment of the invention, the measuring device does not include a temperature probe 16. The measurement transmitter nozzle 15 is then responsible for the tight sealing of the opening in the measuring tube 2 formed by the T-joint 3. It does not then possess, for example, an opening for a temperature sensor, which is here not presented, or the opening is sealed with a plug. If an ultrasound flow measuring device is sold, the customer can decide whether to buy a device with or without temperature sensor, and the measurement transmitter nozzle 15 is correspondingly embodied. Otherwise, nothing changes in the structural embodiment of the measuring device. The cables of the temperature probe 16 extend inside the measurement transmitter neck 17 and are, consequently, protected against the environment. In an example of an embodiment not shown here, the measurement transmitter nozzle 15 includes an internal thread, into which is screwed a measuring transducer, e.g. the temperature sensor 16, or else a blind plug.

In the case of temperature-compensated gas flow measuring devices, in the state of the art, the temperature sensor is isolated from the ultrasonic transducers and the associated measurement transmitter, i.e. an additional opening for introducing the temperature probe is made in the measuring tube. Somewhat the same is true also for a pressure sensor for pressure compensation. The temperature probe and/or the pressure sensor is then in turn connected with the measurement transmitter by cable.

The invention claimed is:
1. A measuring device, comprising:
    at least one measurement transmitter; and
    a measuring tube, which has at least one T-joint, which is connected with said at least one measurement transmitter, said at least one measurement transmitter processing at least one measured value of at least one process variable, wherein:
    said measuring tube comprises metal or a metal alloy;
    said measuring tube together with said T-joint is monolithic; and
    said T-joint is produced from said measuring tube at least partially by a plastic deformation method.
2. The measuring device as claimed in claim 1, wherein: said measuring tube has a circularly round cross section.
3. The measuring device as claimed in claim 1, wherein: said T-joint has an approximately planar end.

4. The measuring device as claimed in claim 1, wherein:
said T-joint has a circularly round cross section at an end of said T-joint.

5. The measuring device as claimed in claim 1, wherein:
said T-joint has an approximately constant wall thickness at the end said T-joint.

6. The measuring device as claimed in claim 1, further comprising:
a measuring transducer for registering at least one measured value of at least one process variable.

7. The measuring device as claimed in claim 6, wherein:
said measuring transducer is a temperature sensor.

8. The measuring device as claimed in claim 6, wherein:
said measuring transducer is connected with said T-joint.

9. The measuring device as claimed in claim 6, wherein:
said measuring transducer at least partially protrudes into said T-joint and is contactable by a measured medium in said measuring tube.

10. The measuring device as claimed in claim 6, wherein:
said measurement transmitter and/or said measuring transducer tightly seals an opening in said measuring tube formed by said T-joint.

11. The measuring device as claimed in claim 6, wherein:
the measuring device has at least two other, equally constructed T-joints, at which, in each case, an ultrasonic transducer is arranged; and
said two ultrasonic transducers are of equal construction.

* * * * *